Patented June 7, 1932

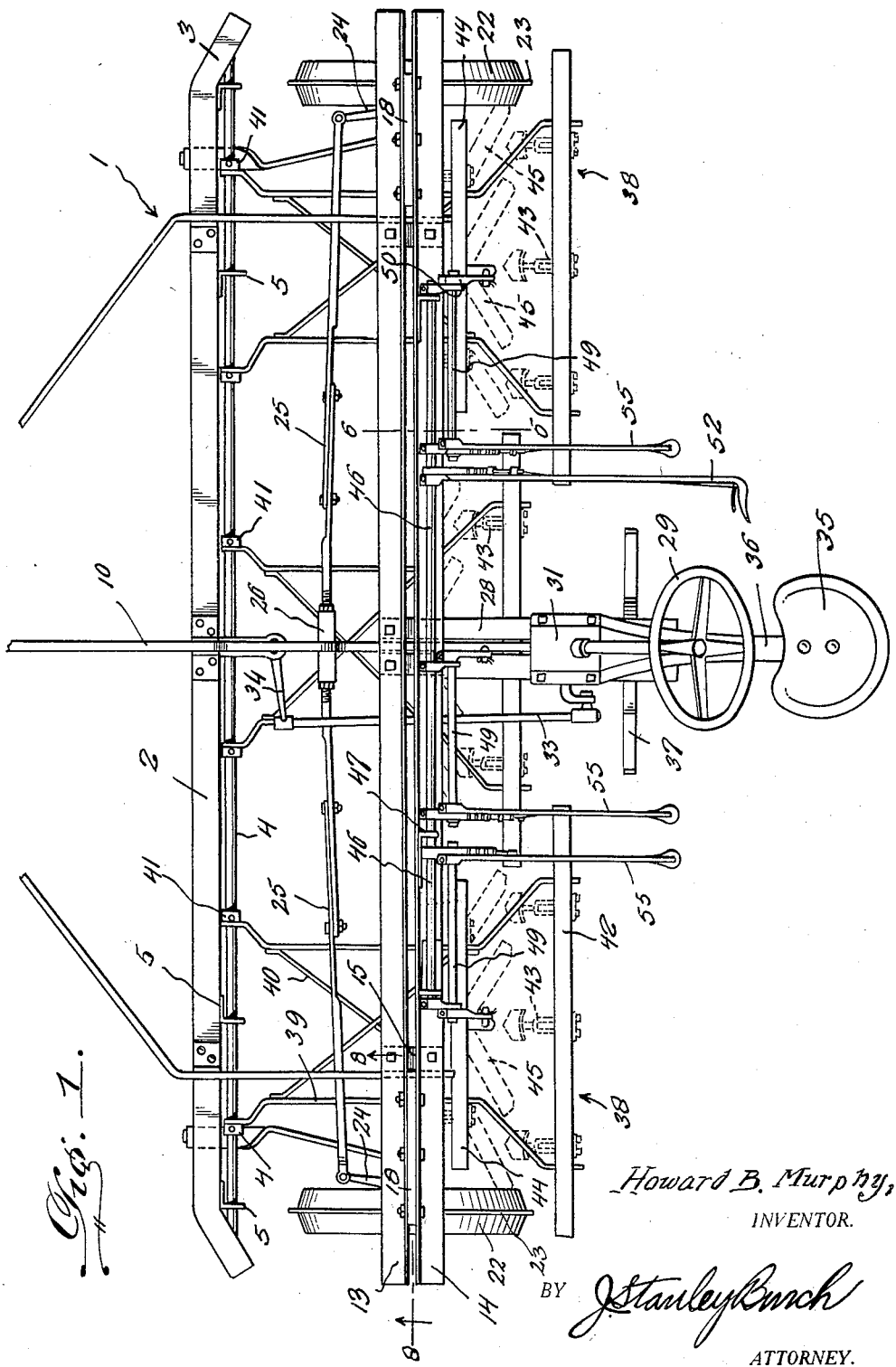

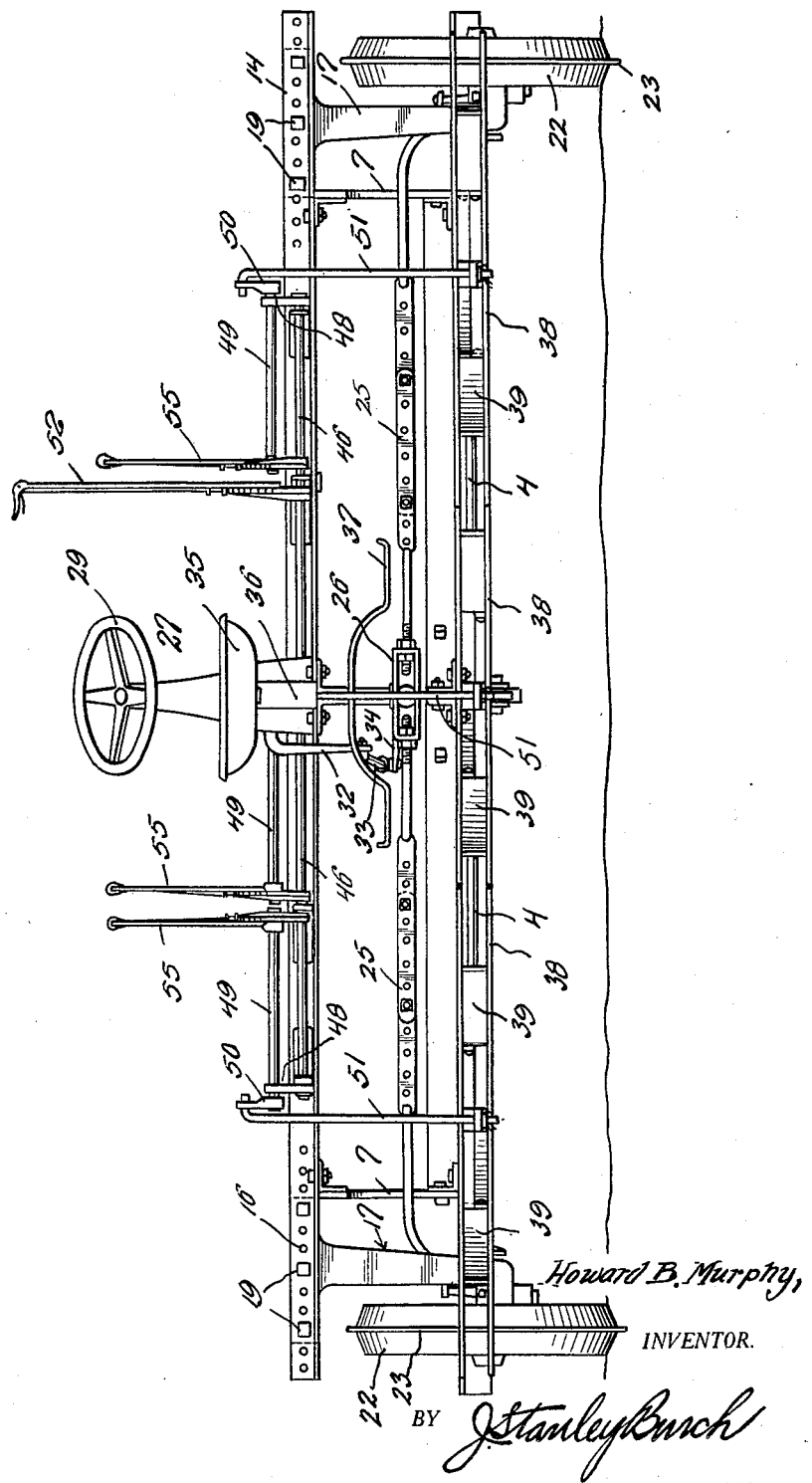

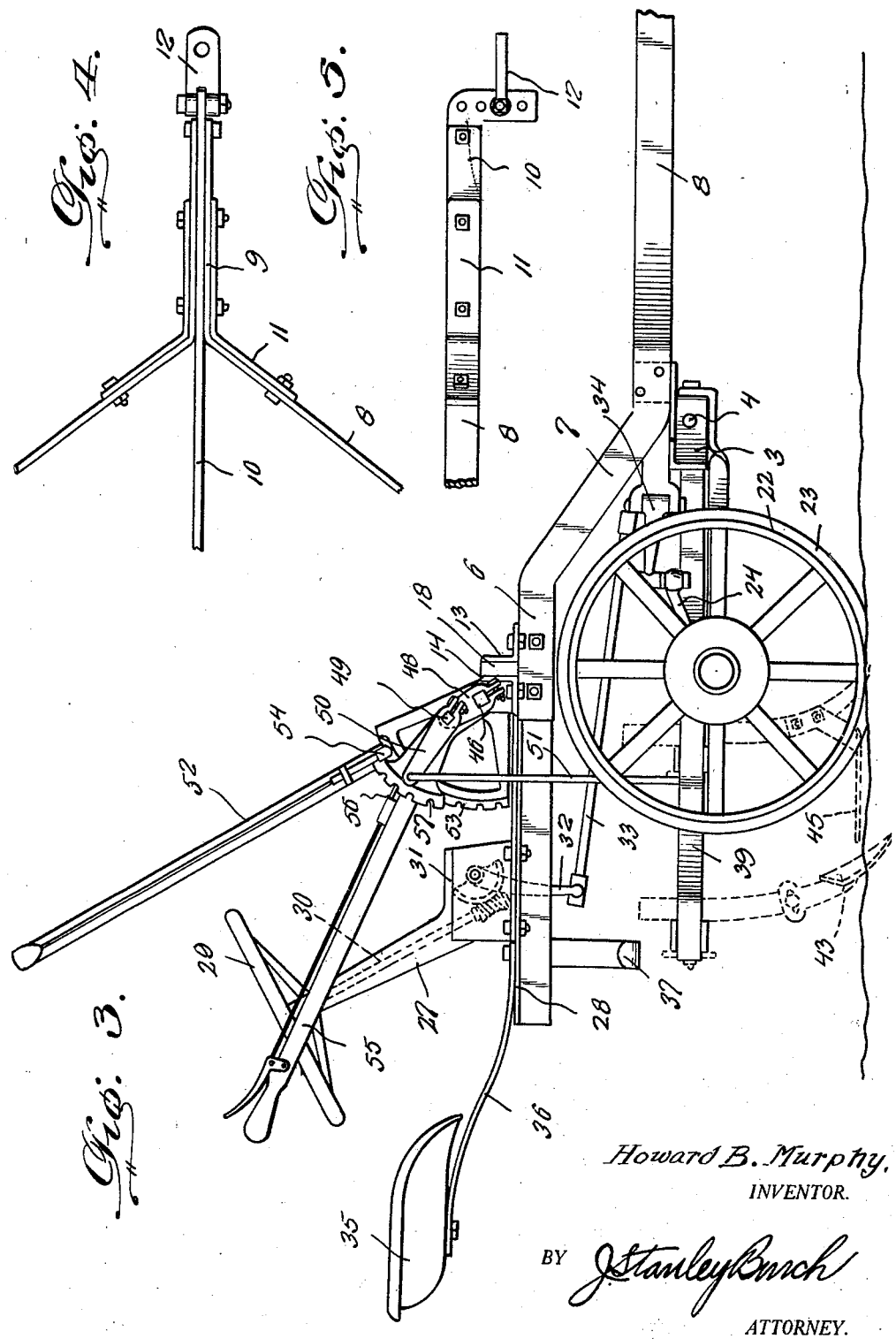

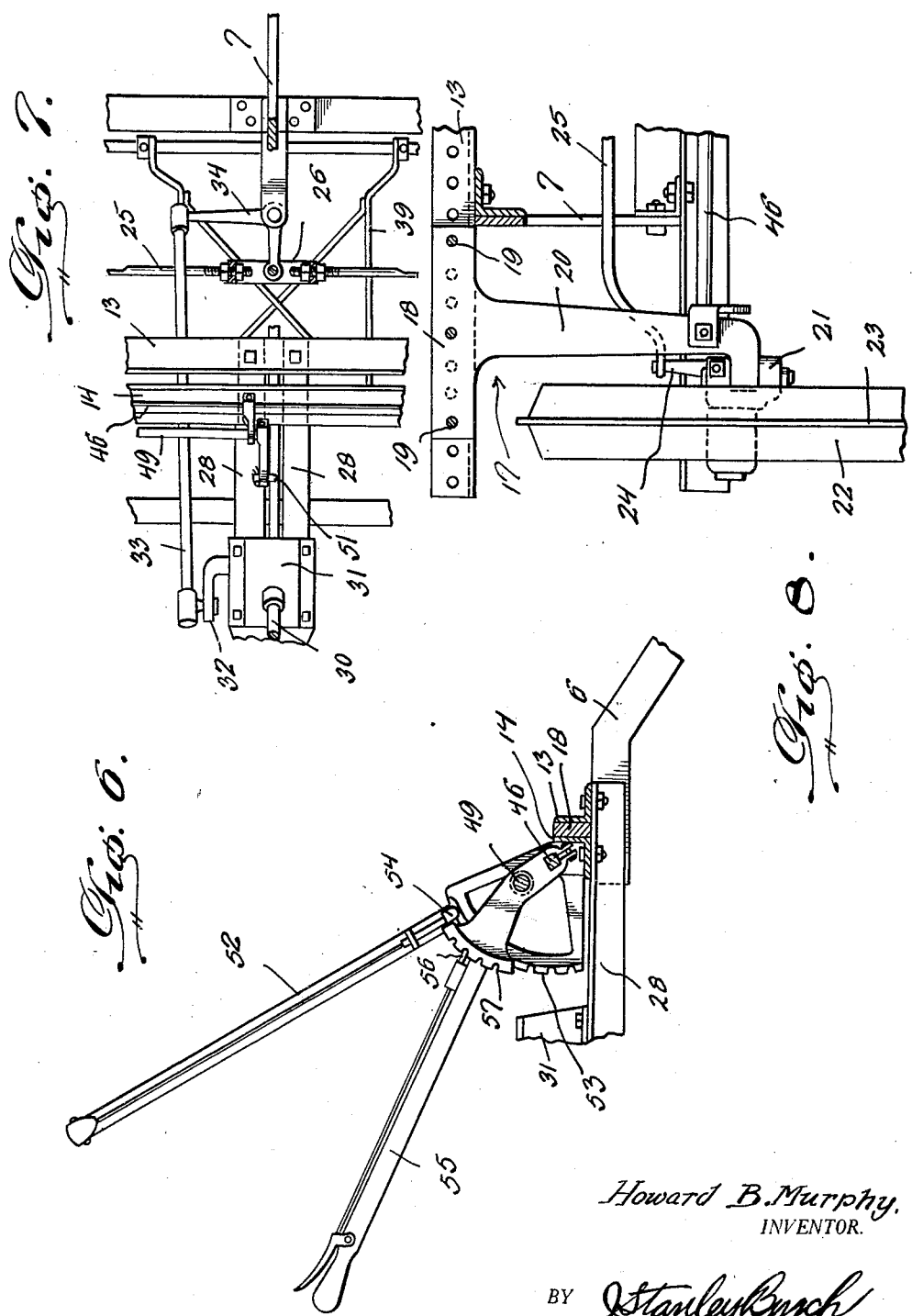

1,861,544

UNITED STATES PATENT OFFICE

HOWARD BENJAMIN MURPHY, OF WATSONVILLE, CALIFORNIA

CULTIVATOR

Application filed July 9, 1929. Serial No. 376,970.

The present invention relates to improvements in cultivators and has for its principal object to provide a machine of this character which may be used for cultivating any crops.

One of the important objects of the present invention is to provide a cultivator wherein means is provided whereby a gang of cultivator units may be carried by the frame structure, means being further provided for effecting the raising and lowering of the gangs of cultivators either simultaneously or independently.

Another important object of the invention is to provide a cultivator of the above-mentioned character that includes an improved steering mechanism whereby the machine will be caused to travel over the rows of plants in a positive and efficient manner, the wheeled cultivator being particularly adapted to be connected behind a tractor whereby the same may be drawn over the crops.

Another important object of the invention is to provide a cultivator of the above-mentioned character wherein the main frame construction is of sectional formation, the wheel supporting standards being adjustably mounted in the sectional frame structure so that the width of the machine or cultivator can be adjusted depending upon the distance between the rows of the growing crops that are to be cultivated and over which the cultivator travels.

Another important object is to provide a cultivator of the above-mentioned character that will at all times be positive and efficient in its operation, the parts being further so arranged as to permit ready and easy operation thereof and to further permit assembly or disassembly thereof in a quick and efficient manner.

Other objects and advantages of the invention will become apparent from the following description when taken in connection with the accompanying drawings.

In the accompanying drawings wherein like reference characters indicate corresponding parts throughout the same;

Figure 1 is a top plan view of my improved cultivator.

Figure 2 is a rear end elevation thereof.

Figure 3 is a side elevation.

Figure 4 is a fragmentary top plan view of the converging forward end of the frame bars showing the draft connection for coupling the cultivator to a tractor.

Figure 5 is a side elevation thereof.

Figure 6 is a sectional view taken approximately on the line 6—6 of Figure 1.

Figure 7 is a fragmentary plan view of the connection between the drag link and the adjustable link that connects the adjacent ends of the tie rods; and Figure 8 is a detail of one of the V-shaped standards forming a salient part of the present invention.

In the drawings wherein for the purpose of illustration is shown the preferred embodiment of my invention, the numeral 1 designates generally the frame structure of the cultivator, the same including an elongated angle iron cross bar 2 that has extending through the diverging end portions 3 thereof the longitudinally extending rod 4 as is more clearly shown in Figure 1. The purpose of this rod will be hereinafter more fully described. Suitable angular supporting brackets 5 extend rearwardly from the vertical wall of the angle iron cross bar 2 to support the rod 4.

The frame includes a pair of spaced outer beams 6 that are disposed above the cross bar 2 and rearwardly thereof. These outer beams 6 are bent intermediate their ends and are directed downwardly as indicated at 7 in Figure 3, and the forward ends of the outer beams 6 gradually converge as shown at 8, the forward extremities of these outer beams being disposed in parallel spaced relation as shown at 9 in Figure 4. A central beam 10 extends across the central portion of the cross bar 2 and the forward end portion of the central beam 10 is disposed between the parallel spaced forward end portions 9 of the outer beams 6 and suitable fastening means extend through the abutting portions of the aforementioned beams as well as through suitable bracing strips of metal 11 that are associated with the forward extremities of the outer beams as also suggested very clearly in Figure 4.

The forward end of the central beam 10 projects beyond the forward ends of the outer beams 9 and connected thereto is a suitable tractor hitch 12 whereby the cultivator can be attached to a tractor not shown for moving the machine over the crops that are to be cultivated.

The invention further comprehends the provision of a pair of elongated angle iron cross beams denoted by the numerals 13 and 14 respectively. These cross beams are disposed longitudinally with respect to the cross bar 2 and extend transversely across the rear ends of the beams 6 and 10 and are connected thereto by suitable brackets shown at 15 in Figure 1. The vertical portions of the angle iron cross beams 13 and 14 are disposed in spaced relation with respect to each other and a series of spaced openings 16 are formed in the outer end portions of the vertical walls of said angle iron cross beams. Forming a salient part of the cultivator are the substantially T-shaped standards denoted generally by the numeral 17, the same being adapted to provide a support for the steering knuckles to be later described in detail. The head portion 18 of each T-shaped standard is formed with a series of spaced openings that are adapted to be positioned in alinement with the predetermined openings 16 and suitable fastening means 19 extend through the registering openings formed in the vertical walls of the cross beams and the heads of the respective standards whereby to secure said standards in a rigid manner at the respective ends of the cross beams. The depending portion or leg 20 of each T-shaped standard 17 is disposed laterally at its lower extremity to provide a support for the steering knuckle shown generally at 21 which steering knuckle is operatively connected to the hub of the ground-engaging wheel 22 in the manner well known in the art. The wheel 22 is preferably formed with a centrally located flange 23 that extends circumferentially about the outer peripheral face thereof to afford more efficient steering and the edge portions of the rim are preferably convexed to prevent damp soil from packing upon the frame of the wheel. The central arm that is associated with the steering knuckle 21 is shown at 24 and connected to the outer ends of the forwardly extending spindle arms 24 are the outer ends of the sectional tie rods 25. Each tie rod is preferably composed of a pair of complementary sections that are adjustably connected together at their inner opposed ends and the inner opposed ends of the tie rods are in turn adjustably connected together by means of a connecting link shown at 26 in Figure 7. In this manner, the spindle arms 24 are operatively connected together so that the wheels 22 will steer in unison and when the standards 20 that are employed for supporting the wheels are adjusted with respect to the cross beams 13 and 14, the sectional tie rods will also be adjusted.

The improved steering mechanism further includes a steering column 27 that extends upwardly from the platform 28. This platform extends rearwardly from the central portion of the angle iron cross beams 13 and 14. A steering wheel 29 is mounted on the upper end of the steering rod 30 that extends longitudinally through the steering column 27 and a gear housing 31 is arranged at the base of the steering column for housing the conventional gearing that connects the steering rod 30 with the steering arm 32. The lower end of the steering arm is in turn operatively connected to the rear end of the drag link 33 and this link is operatively connected at its forward end to the connecting link 26 by the bell crank lever shown at 34 in Figure 7.

The steering wheel 29 is controlled by the operator of the cultivator occupying the seat 35 supported on the upper rear end of the seat supporting bar 36 that is carried by the rear end portion of the platform 28 and also carried by the rear end portion of the platform are the foot rests 37.

The cultivator includes the provision of a series of gang cultivator units and in the present instance, three of such units are disclosed. Each unit which is denoted generally by the numeral 38 includes a pair of spaced bars 39 having diagonally disposed braces 40 arranged therebetween. The forward ends of these rods 39 are mounted for swinging movement on the rod 4 and adjustable collars 41 are secured on the rod 4 for maintaining the respective units in any predetermined adjusted position with respect to the rod and with respect to each other. A cross beam 42 extends across the rear ends of the bars 39 and the cultivator elements shown in the dotted lines at 43 are supported by the beam 42. As the particular cultivator elements form no important part of the present invention, a detailed description thereof is believed unnecessary. Additional cross beams 44 extend across the respective pairs of bars 39 forwardly of the cultivator element carrying means 42 and weeders shown in dotted lines at 45 are supported from the forward cross beams 44 in advance of the cultivator elements 43.

These units 38 are adapted to be raised or lowered either simultaneously or independently of each other and to this end, there is provided a main rock shaft 46 that is journaled in suitable brackets 47 carried by the vertical wall of the rear angle iron cross beams 14 at the central portion thereof. Secured to the rock shaft 46 for swinging movement therewith are the relatively short rocker arms 48, one being positioned adjacent the central portion of each unit 38. Another one of each of these rocker arms 48 is positioned adjacent one end of each unit 38 and journaled in the outer ends of the respective pairs of rocker arms 48 is the auxiliary rock shaft 49. An auxiliary rocker arm 50 is carried by each auxiliary rock shaft 49 and a rod 51 operatively connects the outer end of each auxiliary rocker arm 50 with the respective units 38 as indicated very clearly in Figure 3.

A master lever 52 is operatively connected at its lower end with the main rock shaft 46 for actuating the same, the lever 52 being preferably located adjacent the driver's seat 35. Obviously by actuating the lever 52, the main rock shaft 46 will be actuated whereby to effect the raising and lowering of all of the units simultaneously and for maintaining the units in any vertically adjusted position, there is provided the toothed segment 53 and a cooperating pawl 54.

For the purpose of enabling the units to be raised and lowered independently of each other, there is associated with each auxiliary rock shaft 49, an actuating lever 55 that is also located within easy reach of the driver occupying the seat 35. A pawl and ratchet mechanism such as is shown at 56 and 57 is associated with each auxiliary rock shaft 49 and its respective actuating lever 55 for enabling said units to be vertically adjusted independently of each other.

The provision of a cultivator of the above-mentioned character enables the distance between the ground-engaging wheels to be adjusted depending upon the width of the rows over which the cultivator travels and furthermore the necessary adjustments are made in the steering mechanism to compensate for the adjustment between the ground-engaging wheels. The cultivator is designed to be drawn by a tractor and may be used on any crop which is planted in multiple rows and more particularly the cultivator will work after a six row beet, bean and lettuce drills or behind a three row corn planter.

The simplicity of my improved steering mechanism enables the cultivator to be readily and easily guided. Furthermore a cultivator of the above construction can be readily and easily assembled or disassembled and access to the several parts can be had without difficulty. A machine of this kind will at all times be positive and efficient in its operation as well as being strong and durable.

While I have shown the preferred embodiment of my invention, it is to be understood that minor changes in the size, shape and arrangement of parts may be resorted to without departing from the spirit of the invention or the scope of the appended claims.

What is claimed is:

1. In a cultivator, the combination of a frame, a main rock shaft mounted on the frame, main rocker arms carried by the main rock shaft, auxiliary rock shafts carried by respective pairs of main rocker arms, auxiliary rocker arms carried by each auxiliary rock shaft, a plurality of cultivator devices mounted for swinging movement on the frame, means operatively connecting each auxiliary rocker arm with the respective cultivating device, a main lever for actuating the main rock shaft whereby all of the cultivating devices may be raised or lowered simultaneously, auxiliary levers operatively connected with the respective auxiliary rock shafts whereby the cultivating devices may be raised independently, and means for maintaining the levers in any adjusted position.

2. In a cultivator, the combination of a frame, an elongated rod mounted on the frame, a plurality of cultivating devices, each including a pair of spaced bars mounted for vertical swinging movement at their forward ends on the rod, cross beams carried by the rear end portions of the respective pairs of bars and from which earth-engaging implements are adapted to be supported, said bars being slidable along the rod, collars adjustably secured on the rod for maintaining the bars of each cultivating device against sliding movement on the rod, and means for raising and lowering the cultivating devices, either simultaneously or independently of each other, including a main rock shaft journaled on the frame, rocker arms carried by the shaft, auxiliary rock shafts carried by said arms, and rocker arms carried by the auxiliary rock shafts and connected with said cultivating devices.

In testimony whereof I affix my signature.

HOWARD BENJAMIN MURPHY.